TAPE CLEANER

Filed June 29, 1964

INVENTOR
RAYMOND E. MAC GREGOR

BY Edward M. Farrell

ATTORNEY

United States Patent Office 3,274,636
Patented Sept. 27, 1966

3,274,636

TAPE CLEANER

Raymond E. MacGregor, Doylestown, Pa., assignor to Sperry Rand Corporation, New York, N.Y., a corporation of Delaware Filed June 29, 1964, Ser. No. 378,791
5 Claims. (Cl. 15—306)

Figures 1, 2:
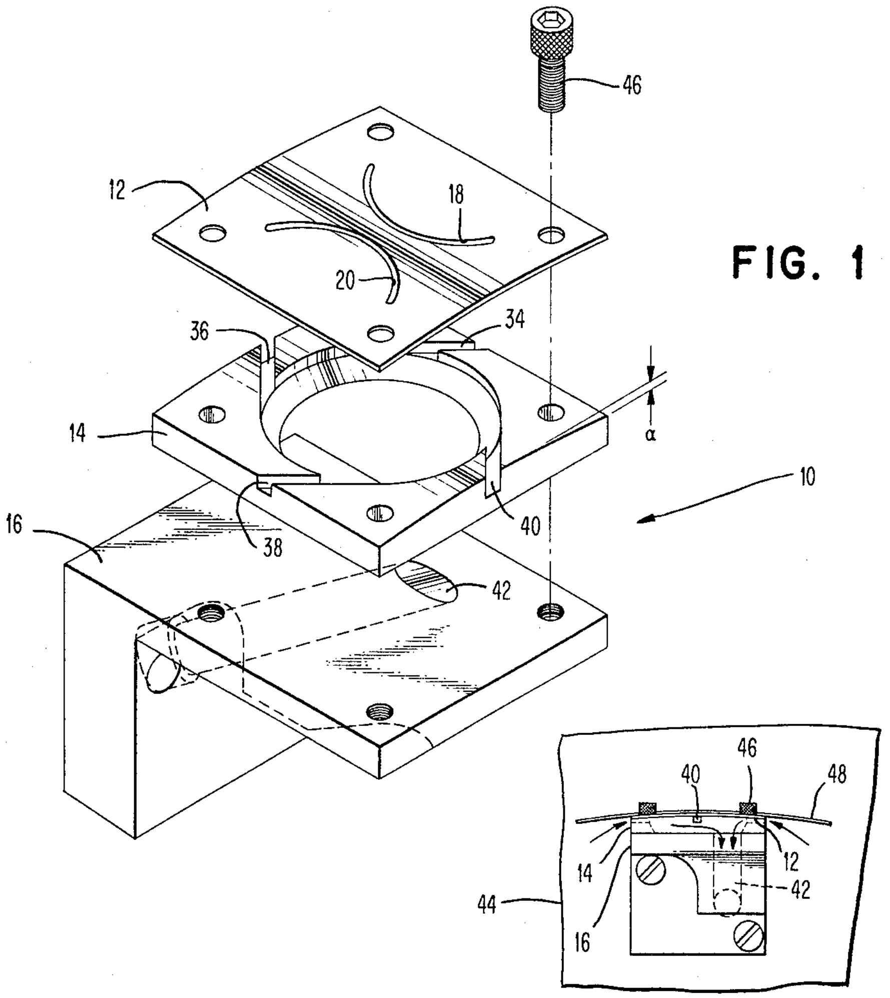

This invention relates to magnetic recording tapes, and more particularly to means for cleaning such tapes.

Much of the magnetic tape in use at the present time includes a plastic, Mylar or similar type backing having a magnetic oxide coating providing a recording surface. During a read-in operation, the tape is moved past a recording head and coded information is recorded by means of magnetizing discrete spots of the oxide coating. During a read-out operation, the recorded tape is moved past a read head and the recorded spots are detected.

Because of the high packing density of the information on the tape, the recording surface of the tape must be kept free of all foreign materials, as well as bits which may flake off the recording surface, in order to maintain intimate contact of the tape with the head. Tape defects, which include foreign matter or irregularities in the tape surface, cause loss of information by moving the tape away from the read and/or record head. If a small portion of the tape is separated from the head by even a very small distance, the read voltage pulse amplitude will be appreciably reduced.

The building up of foreign material on the surface of the tape eventually causes the tape to be discarded because of the excessive drop-outs. This adds considerably to the cost of maintaining stored type information. Also, if information is lost, by defective tapes, valuable computer time is lost.

In addition to the disadvantages mentioned above, a tape having foreign particles on it tends to wear the magnetic head with which it is associated during operation. Also, oxide deposits are built up on the magnetic head, preventing recording and read back.

Many methods have been used in the past to clean tape. However, most of these methods have used scraping which tend to wear the tape excessively as well as destroying the recorded information. Other methods have employed techniques which have involved ultrasonic cleaners, cleansers and other cumbersome, inconvenient and slow techniques. Still other types of tape cleansers have resulted in different or unbalanced pressures on the tape during operation at different places during the cleaning operation resulting in uneven wear of the tape and subsequent trouble in reading back the recorded information.

It is an object of this invention to provide an improved tape cleaning device.

It is a further object of this invention to provide an improved tape cleaning device for minimizing distortions of the tape during a cleaning operation.

It is still a further object of this invention to provide an improved tape cleaning device in which a cleaning operation is performed evenly on the tape without excess wear on any one portion of the tape.

It is still a further object of this invention to provide an improved tape cleaning device in which dirt and other foreign particles are removed from the information bearing portion of a tape and carried away before they can become reimbedded in the tape.

In accordance with the present invention, a device is provided for cleaning tape as it is moved in a longitudinal direction. The device includes a scraper unit having a relatively hard smooth surface for engagement with said tape. The scraper unit includes an arcuate slot having a cutting edge disposed to contact the tape during operation. A chamber is disposed below the scraper unit for receiving particles removed from the tape by the cutting edge. Fluid pressure within the chamber then remove the particles from chamber away from the cutting edge, the tape and out of the chamber.

Figure 3:
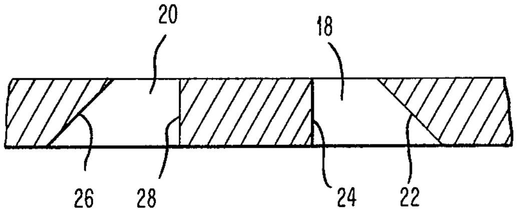

Other objects and advantages of the present invention will be apparent and suggest themselves to those skilled in the art, from a reading of the following specification and claims, in conjunction with the accompanying drawing, in which:

FIGURE 1 is an exploded view of a tape cleaning device, in accordance with the present invention, FIGURE 2 is an assembled front view of the tape cleaner device of the present invention during a tape cleaning operation, and FIGURE 3 is an enlarged cross-sectional view of the scraping portion of the tape cleaning device of FIGURE 1.

Referring particularly to FIGURES 1, 2 and 3, a tape cleaning device 10 comprises a main cutting element 12, an inlet plate element 14 and an outlet block element 16.

The main cutting element 12 includes a pair of arcuate slot openings 18 and 20. As more clearly illustrated in FIGURE 3, one side 22 of the slot opening 18 includes a cutting edge and the other side 24 is square, exerting no force at right angles to the plane of the tape during operation. Likewise, the slot opening 20 includes one side 26 having a cutting edge with the other side 28 being square. The purpose of the two slot openings is to perform the cleaning operation when the tape is moved in either of two directions.

The inlet plate element 14, which may be considered as having a cylindrical top surface, includes a circular cut-out area 32 having four inlet openings 34, 36, 38 and 40 disposed tangentially thereto.

The mounting block 16 includes an outlet conduit 42. The mounting block 16 may be suitably mounted to the main body 44 of the tape equipment (FIGURE 3).

The main cutting element 12, which may be curved to conform to the contour of the top portion of the plate element 14, the inlet plate element 14 and the block element 16 may be assembled by screws, such as the screw 46. When the unit 10 is assembled, the area 32 forms a chamber between the main cutting plate 12 and the mounting block 16. The conduit 42 may be connected to a source of vacuum or low pressure to cause a flow of air through the inlets 34, 36, 38 and 40 during operation. The circulating air within the chamber is led out through the outlet conduit 42.

When attached to the top curved portion of the plate element 14 the top portion of the cutting element 12 forms a hard smooth cylindrical surface interrupted to form one or more sharp acute coupled cutting edges. When the scraper is positioned in contact with the tape 48 (FIGURE 2) under linear tension, the oxide surface of the tape conforms to and is supported by the cylindrical surface. While the tape 28 travels at right angles to the axis of the cylinder, the transverse cutting edge shaves and/or lifts dirt from the surface of the oxide coating of the tape.

The cutting edges are curved with respect to the elements of the cylindrical surface of the element 12 in the area of contact with the tape to effect a shearing cut and to plow sticky particles towards the edges of the tape. The supporting cylindrical surface opposite the cutting edge is kept close to prevent gouging and follows the curvature of the cutting edge. The geometry of the curvature and the width of the slot is preferably selected so that any part of the tape is always supported across its width at three points lying on a straight line coincident with an element of the cylindrical surface, and element being considered a straight line on a curved surface. The ends of the cutting edges curve in the direction of tape travel to prevent catching the edges of the tape.

During operation, ambient air, expanding and increasing in velocity and turbulence, flows through the nozzles or inlet openings 34, 36, 38 and 40 and assumes a rotating pattern of flow past the scraper to carry particles from the oxide coated portion of the tape 48 into a vortex towards the outlet 42 within the block 16. The outlet 42, as mentioned, may be connected to a source of low pressure or vacuum.

The outlet 42 is tangent to a circle centered with the cut out area 42 in a plane at an angle to the axis of the cylindrical cavity. The angle is disposed in the general direction of the helix angle of the vortex in order to allow uniform flow of air. The particles collected from the tape 48 may be accumulated in a filter within the vacuum line connected to the outlet conduit 42.

Particles plowed to the edge of the tape by the curved cutting edges 22 and 26 are entrained by the flow of air directly into the cavity at this point where the cutting edges extend past the edge of the tape. A minimum static pressure differential may be obtained between ambient air and air within the cylindrical cavity by selection of nozzle dimensions adequate for the desired air flow.

Various modifications of the embodiment illustrated may be made without departing from the scope of the invention. For example, the main cutting element 12 may assume various different radii of curvature. In some cases, it may be desirable to have more than one rate of curvature. The screws, such as the screw 48 may be mounted on the side of the cleaning device 10 rather than on the top, as illustrated. This would necessitate bends at the ends of the main cutting element 12.

The inlet plate block 14 may also take a variety of different forms, dependent upon the particular design requirements of the system with which it is used. For example, the inlet openings 34, 36, 38 and 40 may be shaped in various other forms than that illustrated. Instead of being straight and sawed at a tangent to the circular area 32, the openings may be tapered with a wide open area facing the atmosphere gradually tapering inwardly as it approaches the chamber to facilitate the creation of a vortex movement of air.

The number of openings in the block 14 may be greater or less than the four illustrated. For example, another four openings could be provided at the bottom of the block to produce a total of eight inlet openings.

While the air chamber formed by the cutout area 42 is illustrated as being below the scraper unit 12 and the tape 48, it is emphasized that the cleaning of the oxide coating of the tape is not accomplished primarily as a result of gravity or particles having to fall within the stream of air flow. The air flow within the chamber actively carries the removed particles away from the tape, the cutting edges and out of the chamber. Consequently, the tape cleaning device 10 may be disposed in any position; i.e., sideways or even up-side down without affecting the operation of the cleaning device of the present invention.

The present invention has, therefore, provided two main features which has made it possible to provide an improved tape cleaning device. First, the arrangement of the cutting edges have made it possible to remove particles from the oxide coating of the tape without materially affecting the wear of the tape or destroying information stored therein. Second, the particles are actively removed from the area of tape operation by a moving stream of air.

The embodiments of the invention in which an exclusive property or privilege is claimed are defined as follows:

1. A tape cleaner comprising: a scraper unit having a relatively hard smooth cylindrical surface for engagement with said tape, said scraper unit having a pair of arcuate slots, each of said slots including a single cutting edge disposed to contact said tape during operation, a block element having a chamber disposed below said scraper unit for receiving particles removed from said tape by said cutting edge, said chamber being shaped to provide a vortex movement of air when air is caused to be moved within said chamber, said block including a plurality of apertures arranged to permit air from the atmosphere to enter said chamber in the same tangential flow direction, and vacuum means connected to said chamber to cause a vortex movement of said air within said chamber to force particles removed from said tape to be moved away from said tape and out of said chamber.

2. A tape cleaning unit for cleaning a tape adapted to be moved in one of two directions comprising: a scraper unit having a relatively hard smooth cylindrical surface for engagement with said tape, said scraper unit having a pair of similar arcuate slots, each of said slots including a single cutting edge and a relatively flat non-cutting edge disposed to contact said tape in a transverse direction during operation, a block element having a substantially circular cut out portion to form a chamber below said scraper unit, said chamber providing a vortex movement of air when air is caused to be moved within said chamber, said block including a plurality of apertures arranged to permit air from the atmosphere to enter said chamber in the same tangential flow direction, said apertures directing air into said chamber at an angle substantially tangent to the circular cut out portion of said chamber, and a low pressure source including a conduit leading from said chamber to cause a vortex movement of said air within said chamber to force particles removed from said tape to be moved away from said tape and out of said chamber through said conduit.

3. The invention as set forth in claim 2 wherein the cutting edges of said slots are oppositely disposed with respect to each other so that only one cutting edge is effective when said tape is moved in one direction, with the other edge being effective when said tape is moved in the other direction.

4. The invention as set forth in claim 3 wherein the curvature of said cutting edge of each of said slots is such that said tape is supported at three points across its width on said cylindrical surface of said scraper unit.

5. The invention as set forth in claim 4 wherein said conduit leading from said chamber is disposed tangentially to the circular cut out portion of said chamber.

References Cited by the Examiner

UNITED STATES PATENTS

| | | | |
|---|---|---|---|
| 2,908,495 | 10/1959 | Andrews et al. | 226—95 |
| 3,035,295 | 5/1962 | Buslik et al. | 15—308 X |
| 3,091,794 | 6/1963 | Pillsbury | 15—308 |

FOREIGN PATENTS

| | | |
|---|---|---|
| 1,064,699 | 9/1959 | Germany. |

ROBERT W. MICHELL, *Primary Examiner.*